United States Patent [19]

Le Mair et al.

[11] 4,251,801
[45] Feb. 17, 1981

[54] MOBILE DATA COMMUNICATION SYSTEM

[75] Inventors: Willem Le Mair; Antonius N. C. Vereijken, both of Eindhoven, Netherlands

[73] Assignee: U.S. Philips Corporation, New York, N.Y.

[21] Appl. No.: 78,549

[22] Filed: Sep. 24, 1979

[30] Foreign Application Priority Data

Oct. 10, 1978 [NL] Netherlands .................. 7810017

[51] Int. Cl.³ ............................................. H04Q 9/00
[52] U.S. Cl. .............................. 340/147 SY; 340/170
[58] Field of Search ................... 340/147 SY, 170; 455/51

[56] References Cited

U.S. PATENT DOCUMENTS 2,980,858  4/1961  Grondin .................. 340/147 SY

*Primary Examiner*—Harold I. Pitts

*Attorney, Agent, or Firm*—Thomas A. Briody; William J. Streeter; Edward W. Goodman

[57] ABSTRACT

A mobile data communication system in which a fixed station consecutively interrogates a fleet of vehicles to receive and send messages thereto. A receiver of the fixed station effects for each vehicle in turn synchronism with the reply message transmitted by the relevant vehicle. To do this the bit phase error between the reply message signal and a clock signal produced by the fixed station is measured in the latter by means of a phase discriminator 22 and corrected in a control loop comprising also an integrator 23 an adder 21 and a divider 18 as shown in FIG. 2. A store 26 stores information relating to the position of the vehicles, and control means use this information to produce a control signal corresponding to the bit phase error caused by the time delay of the message from the fixed station to the vehicle and vice versa. A switch 24 is operated at the beginning of each message sequence to feed the control signal into the control loop to practically correct the bit phase error.

3 Claims, 3 Drawing Figures

MOBILE DATA COMMUNICATION SYSTEM

BACKGROUND OF THE INVENTION

The invention relates to a mobile data communication system of a type comprising a fixed station and at least two mobile stations, the fixed station and the mobile stations each comprising a transmitter and a receiver, the transmitter of the fixed station consecutively interrogating the mobile stations, the receiver of each mobile station being synchronized with messages transmitted by the transmitter of the fixed station, and the receiver of the fixed station being synchronized with reply messages consecutively transmitted by the transmitters of the mobile stations, by applying to a control unit of a controllable divider of a clock signal generator a control signal produced by measuring in a control loop the bit phase difference between each reply message and the clock signals produced by the divider.

Systems of the above type are known wherein a fixed station consecutively interrogates mobile stations comprised by a fleet of vehicles, for example motorbuses. The fixed station transmits uninterruptedly messages which can be received by all vehicles. Each message comprises an unique code so that only the vehicle which responds to the relevant code processes the message and returns a reply message. In this manner the fixed station exchanges messages in a prescribed sequence with the vehicles of the fleet. The fixed station and the vehicles each comprise a transceiver. The receiving frequency of the vehicles is the same as the transmitting frequency of the fixed station and the receiving frequency of the fixed station is the same as the transmitting frequency of the vehicles. As the receivers of the vehicles receive the transmission from the fixed station continuously, bit synchronisation of the receivers of the vehicles with the transmitter of the fixed station is ensured. In contrast the receiver of the fixed station must be separately synchronized for accessing each vehicle in order to receive the reply message transmitted by the relevant vehicle. The reply messages are therefore so arranged that they include synchronisation signals. A drawback of this is that it requires additional transmission time for the reply messages from the vehicles. As a consequence, the interrogation frequency of the fixed station is limited. To satisfy the frequently imposed requirement that it must be possible to exchange a message with each vehicle once in a specified unit of time, it is therefore necessary to limit the number of vehicles which can be "served" by each fixed station.

SUMMARY OF THE INVENTION

It is an object of the invention to provide a mobile data communication system whereby, in a simple manner, extremely rapid accessing of the vehicles is obtained so that the capacity of the fixed station is increased. According to the invention, a mobile data communication system of the type referred to is characterized in that the fixed station comprises; switching means for interrupting the control loop at the beginning of the reception of each reply message for at least a portion of a bit period, together with control means for applying a control signal to the control input of the controllable divider during said bit period, which control signal corresponds to the bit phase error caused by the propagation time of the message from the fixed station to the mobile station concerned and the reply message from that mobile station to the fixed station.

BRIEF DESCRIPTION OF THE DRAWINGS

In order that the invention may be more fully understood reference will now be made by way of example to the accompanying drawing, of which.

DESCRIPTION OF THE PREFERRED EMBODIMENT

Figure 1:
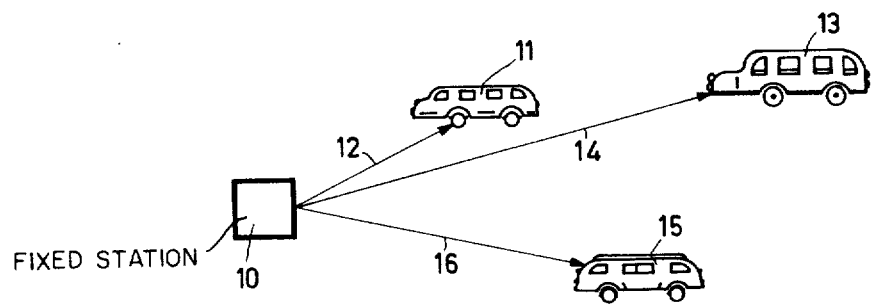
FIG. 1 shows the layout of a mobile data communication system.
Figure 2:
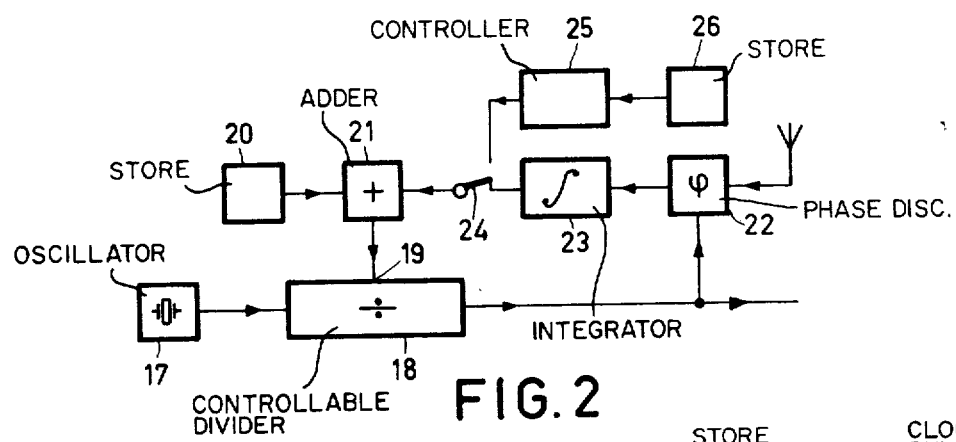
FIG. 2 shows a first embodiment of a portion of a fixed station for use in the system shown in FIG. 1.

Referring to the drawing the system shown in FIG. 1 comprises a fixed station 10, a first vehicle 11 at a distance 12 from the fixed station, a second vehicle 13 at a distance 14 and a third vehicle 15 at a distance 16 from the fixed station, these three vehicles forming mobile stations. For simplicity mobile stations are limited to a flat of three vehicles. A transmitter of the fixed station 10 transmits messages continuously at a frequency $f_o$ for the vehicles 11, 13 and 15 successively and in turn. Receivers of the vehicles 11, 13 and 15 all have the same receiving frequency $f_o$ and can therefor receive all the transmitted messages. Each message comprises a code which is unique to a vehicle so that each vehicle is capable of recognising the message intended for it. Because all the vehicles receive the transmission from the fixed station 10 continuously, the synchronisation of the vehicles with the messages from the fixed station 10 is ensured. If it is assumed, for example, that vehicle 11 recognizes and processes a message at a given instant, then the transmitter of the vehicle 11, which is synchronized with the receiver of the vehicle 11, transmits a reply message at a frequency $f_o'$ to the fixed station 10. The receiver of the fixed station 10 is tuned to frequency $f_o'$. In order to be able to detect the reply message from the vehicle 11 in an error-free manner it is a requirement that the receiver of the fixed station 10 be synchronized with the incoming reply message. To this end, the receiver of the fixed station 10 is arranged as shown in FIG. 2. An oscillator 17, for example a crystal oscillator, applies a signal having a frequency which is high compared with a desired digital clock frequency, to a controllable digital divider 18. A signal, by means of which a dividend of the divider 18 is set, is applied to a control input 19 of the controllable divider 18. This signal is obtained by adding, by means of an adder 21, a control signal to a signal which originates from a store 20 and corresponds to a nominal dividend. The control signal is obtained by applying the clock signal produced by the divider 18, and the received digital signal to a phase discriminator 22, and by applying the difference signal obtained therefrom to an integrator 23. The output signal of the integrator 23 is applied to the adder 21. The operating phase of the control loop thus formed is made accurately equal, or kept accurately equal, to the bit phase of the received signal in an otherwise known manner. When the reply message transmitted by the vehicle 11 has ended, the vehicle 13 transmits a reply message. Although the bit phase of the reply message transmitted by the vehicle 13 is also derived from that message by the fixed station 10, the latter bit phase will be different from that of the reply message transmitted by the vehicle 11 due to different time delays caused by the differences in distance of the vehicles 11 and 13 from the fixed station 10. However, in such a system as is known the fixed station 10 is—for other reasons—informed about the position of the vehicles 11, 13 and 15 due to the exchange of preceding messages. These positions are stored in a store 26 and use thereof can be made in the following manner. A change-over switch 24 is provided between the integrator 23 and the adder 21. In the first switch position, shown in the drawing, the control loop is closed and the arrangement functions as described above. At the beginning of the reception of the next reply message, the switch 24 is switched to a second switch position so that the control loop is interrupted. At the same time a control element 25, which is coupled to the store 26, reads the position of the vehicle 13 and the quotient of the difference of the distances of the vehicles 11 and 13 from the fixed station 10 is determined, using the speed of propagation of the electromagnetic wave phenomena. The difference in the propagation time of data signals from the fixed station 10 to the vehicles 11 and 13, respectively, back to the fixed station 10 is equal to twice the quotient thus determined. In the second switch position of change-over switch 24, the control element 25 applies a control signal to the adder 21, which control signal is applied to the control input 19 of the controllable divider 18 after having been added to the signal originating from the store 20 and corresponding to the nominal dividend. The bit phase, produced by the divider 18, of the clock signal accurately corresponds to the bit phase of the reply message from the vehicle 13. A very short time thereafter (for example one bit period) the switch 24 is reset to the first switch position. Any remaining bit phase error is then corrected in known manner by the control loop consisting of the phase discriminator 22, the integrator 23, the adder 21 and the controllable divider 18. An advantage of this arrangement is that the synchronisation of the receiver of the fixed station 10 with the transmitter of any mobile station is effected within a very short period of time, so that a message need only comprise a relatively few synchronisation signals compared with prior arrangements. As a result, the interrogation frequency can be increased so that the number of vehicles which can be served by the fixed station is increased, or with the interrogating frequency remaining the same the duration of the messages can be extended.

A so-called binary-rate multiplier (as published in The Radio and Electronics Engineer, vol. 45, No. 6, 1975, pages 284-292) or a so-called programmable divide-by-n counter (as published in Electronic Design No. 2, January 1976, page 82) may, for example, be used for the controllable divider 18. The latter implementation has the advantage that the divider is controlled linearly.

Figure 3:
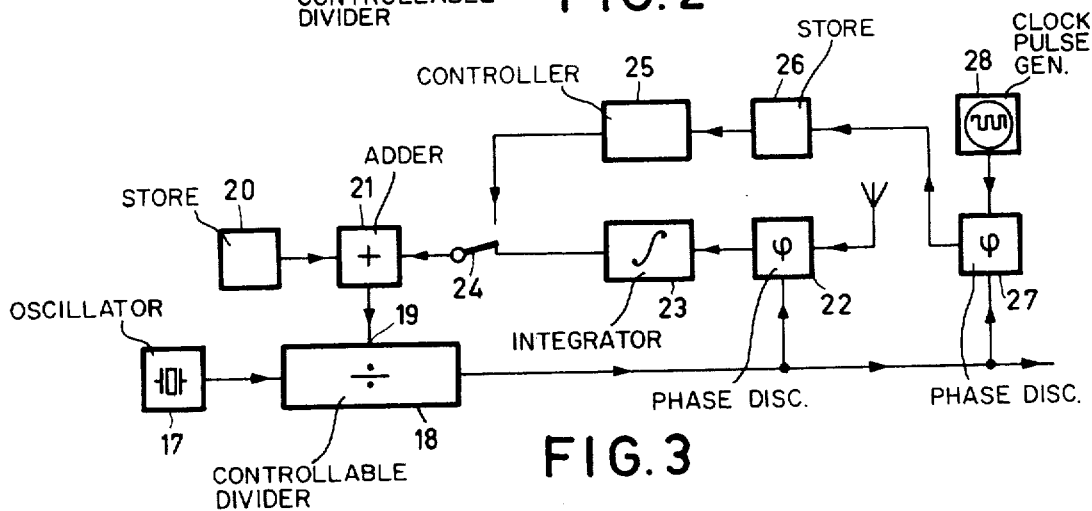
FIG. 3 shows a second embodiment of a portion of a fixed station for use in the system shown in FIG. 1.

Instead of the position of the vehicles, the bit phase error in respect of the vehicles can be stored in the store 26. FIG. 3 shows this embodiment. The operation is as follows. At the end of a reply message from, for example, the vehicle 13, a second phase discriminator 27 compares the bit phase of the receiver in the fixed station 10 (originating from controllable divider 18) with the bit phase of a clock pulse generator 28 of the transmitter of the fixed station 10. The difference value between these bit phases is stored in the store 26 and forms the phase error in respect to the vehicle 13. At the start of the subsequent reply message from the vehicle 13 the control element 25 reads this difference value from the store 26 and this value is applied in the manner described above to the adder 21. An advantage of this latter arrangement is that the synchronisation of the transmitter of the vehicle with the receiver of the vehicle can be dispensed with because any bit phase difference between this transmitter and receiver—provided this does substantially not change during an interrogation cycle—is stored in the store 26 as a portion of the total bit phase error in respect of the vehicle. A further advantage is that the computation propagation of the time difference by means of the control element 25 can be dispensed with. The control element 25 is then limited in its function to a read and addressing element for the store 26.

A vehicle far remote from the fixed station 10 may have difficulty receiving, for example due to a high noise level, which results in an excessive bit error rate. This can be obviated by dividing the area to be covered by the vehicles into a number of districts. The fixed station 10 may then have a separate transceiver in each district. The transceivers in each district generally have bit phases which differ from one to another. A drawback thereof is that the interrogation of the vehicles is done with an abruptly varying bit phase. This can be offset in the following manner. Let it be assumed for simplicity that the area to be covered by the vehicles is divided into two districts, district I and II. The procedure is as follows. The fixed station 10 first deals with all vehicles in district I. At the end of this sequence the fixed station 10 transmits a code which makes all control loops of all vehicles inoperative. This means that the vehicles in district I can no longer be synchronized with messages originating from the fixed station 10, but instead "free run" by means of their own (crystal) oscillator. At the beginning of the messages for district II, the control loops in the vehicles in district II are actuated and synchronisation with the transceiver of district II whereafter communication can start. Because only a very short period of time elapses between two consecutive interrogation cycles of district II, the bit phase of the vehicles has changed only slightly.

If a vehicle of district I enters district II the codes by means of which the control loop of the vehicles can be switched on and off, respectively, are changed into the codes of a new district.

What is claimed is:

1. A mobile data communication system comprising a fixed station and at least two mobile stations, the fixed station and the mobile stations each comprising a transmitter and a receiver, the transmitter of the fixed station consecutively interrogating the mobile stations, the receivers of each mobile station being synchronized with messages transmitted by the transmitter of the fixed station, and the receiver of the fixed station being synchronized with reply messages consecutively transmitted by the transmitters of the mobile stations, by applying to a control input of a controllable divider of a clock signal generator a control signal produced by measuring in a control loop the bit phase difference between each reply message and the clock signals produced by the divider, characterized in that the fixed station comprises; switching means for interrupting the control loop at the beginning of the reception of each reply message for at least a portion of a bit period, together with control means for applying a control signal to the control input of the controllable divider during said bit period, which control signal corresponds to the bit phase error caused by the propagation time of the message from the fixed station to the mobile station concerned and the reply message from that mobile station to the fixed station.

2. A fixed station for use in a system as claimed in claim 1, the fixed station comprising a store wherein the position of the mobile stations at the time of the preceding reply messages is stored, characterized in that the transmitter of each mobile station is synchronized with the receiver of the mobile station and that the control means of the fixed station is coupled to the store to determine the quotient of the distance of the position of the mobile station to the fixed station.

3. A fixed station for use in a system as claimed in claim 1, characterized in that the fixed station comprises a phase discriminator which has a first input coupled to the controllable divider and a second input coupled to a clock signal generator of the receiver of the fixed station to limit the bit phase difference during the receipt of a reply message, an output of the phase discriminator being coupled to a store for storing the bit phase difference, and the control means being connected to this store.

* * * * *